US010486955B1

(12) United States Patent
Griego et al.

(10) Patent No.: US 10,486,955 B1
(45) Date of Patent: Nov. 26, 2019

(54) GAS EXHAUST SYSTEMS

(71) Applicant: ARROWHEAD SUPERIOR BEVERAGE, LLC, Glendale, AZ (US)

(72) Inventors: Manuel J. Griego, Mesa, AZ (US); Daniel T. Duffy, Gilbert, AZ (US); Rosa Cruz, Phoenix, AZ (US)

( * ) Notice: Subject to any disclaimer, the term of this patent is extended or adjusted under 35 U.S.C. 154(b) by 0 days.

(21) Appl. No.: 15/174,905

(22) Filed: Jun. 6, 2016

Related U.S. Application Data

(60) Provisional application No. 62/277,633, filed on Jan. 12, 2016, provisional application No. 62/171,950, filed on Jun. 5, 2015.

(51) Int. Cl.

*B67D 1/12* (2006.01)
*B67D 1/00* (2006.01)
*B67D 1/04* (2006.01)
*A23G 9/04* (2006.01)
*A23G 9/28* (2006.01)

(52) U.S. Cl.

CPC ........... *B67D 1/1252* (2013.01); *A23G 9/045* (2013.01); *A23G 9/28* (2013.01); *B67D 1/0021* (2013.01); *B67D 1/0406* (2013.01)

(58) Field of Classification Search

CPC .. B67D 1/1252; B67D 1/0021; B67D 1/0406; A23G 9/28; A23G 9/045
USPC ........................................... 222/129.1, 481.5
See application file for complete search history.

(56) References Cited

U.S. PATENT DOCUMENTS 2,484,779 A * 10/1949 Buttner ................ B67D 1/0406 137/513
3,240,395 A * 3/1966 Carver ................ B67D 1/0021 222/129.1
4,040,342 A 8/1977 Austin et al.
4,636,337 A 1/1987 Gupta et al.
4,717,045 A 1/1988 Coppola
5,033,645 A * 7/1991 Shannon ............. B67D 1/0009 222/129.1
5,182,084 A 1/1993 Plester
5,664,940 A 9/1997 Du
5,772,412 A 6/1998 Zytynski
6,182,555 B1 * 2/2001 Scheer .................... A47J 31/40 222/129.1
6,712,342 B2 3/2004 Bosko
8,746,506 B2 6/2014 Jersey et al.
9,193,575 B2 11/2015 Jersey et al.
9,316,214 B2 4/2016 Du
9,346,659 B2 5/2016 Brown
2003/0024952 A1 * 2/2003 Mackenzie .......... B67D 1/0004 222/399
2004/0040372 A1 * 3/2004 Plester .............. G01N 15/0826 73/38
2004/0099688 A1 * 5/2004 Davis .................. B67D 1/0037 222/145.1
2011/0094388 A1 * 4/2011 Stanley .................... C12G 3/04 99/276

(Continued)

*Primary Examiner* — Donnell A Long
(74) *Attorney, Agent, or Firm* — Lodestar Patents, PLLC; Raymond J.E. Hall

(57) ABSTRACT

A gas exhaust system particularly designed to collect and exhaust gases, particularly carbon dioxide, from beverage fountain systems where the gasses ordinarily are exhausted to the immediate environment in which the equipment sits, which when an enclosed environment (i.e. a building) may result in a hazardous condition to persons therein.

22 Claims, 6 Drawing Sheets

100
195
F
190
192
193
146
110
135
148

(56) References Cited

U.S. PATENT DOCUMENTS

| | | | | | |
|---|---|---|---|---|---|
| 2012/0291871 | A1* | 11/2012 | Schneider | B67D 1/04 | 137/2 |
| 2013/0319259 | A1* | 12/2013 | Ait Bouziad | A47J 31/4485 | 99/453 |
| 2014/0044632 | A1* | 2/2014 | Zielinski | C01B 32/60 | 423/230 |
| 2015/0069087 | A1* | 3/2015 | Brown | B67D 1/0021 | 222/129.1 |

* cited by examiner

GAS EXHAUST SYSTEMS

CROSS-REFERENCE TO RELATED APPLICATION

The present application is related to and claims priority from prior provisional application Ser. No. 62/171,950, filed Jun. 5, 2015, entitled "GAS EXHAUST SYSTEMS"; and, this application is related to and claims priority from prior provisional application Ser. No. 62/277,633, filed Jan. 12, 2016, entitled "GAS EXHAUST SYSTEMS", the contents of all of which are incorporated herein by this reference and are not admitted to be prior art with respect to the present invention by the mention in this cross-reference section.

BACKGROUND

This invention relates to providing a system for improved gas exhaust systems. More particularly this invention relates to providing a system for exhausting excess carbon dioxide gas in fountain drink machines. Fountain drink machines contain a variety of components that may, during the course of maintenance and/or use, expel excess carbon dioxide. Each component typically expels the carbon dioxide into the environment in which it sits. Therefore, a bulk cola tank experiencing an overpressure will expel carbon dioxide into the "back" room in which it sits, a syrup pump in use will expel carbon dioxide into the environment at the soda fountain, etc. Should enough carbon dioxide be expelled into any given enclosed environment, a potential harm may exist to someone in that environment from the build-up of carbon dioxide gas. Regulators often require carbon dioxide detectors installed in smaller "back" rooms where large components of fountain drink machines are placed, however, detectors have been known to fail and place a person at risk when entering the room. Therefore, there is a need for a way to exhaust the carbon dioxide, from these large component fountain drink machines, in a place other than the enclosed environments in which they typically sit.

OBJECTS AND FEATURES OF THE INVENTION

A primary object and feature of the present invention is to provide a system overcoming the above-mentioned problem.

It is a further object and feature of the present invention to provide such a system to exhaust carbon dioxide into an outdoor environment.

Another primary object and feature of the present invention is to replace carbon dioxide exhaust fittings with fittings connectable to such a system.

A further object and feature of the present invention is to provide such a system with an exhaust manifold to collect various exhausting gas sources into a minimal number of exhaust lines to the outside environment.

Another object and feature of the present invention is to provide such a system that prevents back-pressure of exhausted gas into components of the fountain system preventing harm to such components.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a gas exhaust system, relating to expelled gasses from components of beverage dispensing apparatuses positioned in enclosed spaces, comprising: at least one expelled gas receiver structured and arranged to receive the expelled gasses from multiple components of at least one beverage dispensing apparatus; wherein such multiple components are situate within at least one enclosed environment; and at least one component-receiver coupler structured and arranged to couple at least one component of such multiple components, which expels the expelled gasses, with such at least one expelled gas receiver; wherein such at least one component-receiver coupler comprises at least one fluid pathway isolator structured and arranged to isolate a fluid pathway, between such at least one component and such at least one expelled gas receiver, from such at least one enclosed environment; and at least one external-environment gas exhaust pathway structured and arranged to exhaust the expelled gasses from such at least one expelled gas receiver to an external environment external to the at least one enclosed environment; and at least one directional restrictor structured and arranged to restrict directional flow of the expelled gasses toward such external environment and away from such multiple components; wherein the expelled gasses from such multiple components of such at least one beverage dispensing apparatus are exhausted to such external environment instead of such at least one enclosed environment.

Moreover, it provides such a gas exhaust system wherein such at least one component-receiver coupler further comprises: at least one component coupling fitting; and at least one component gas conduit. Additionally, it provides such a gas exhaust system wherein such at least one component coupling fitting comprises at least one pressure relief valve structured and arranged to relieve gas pressure at at least one threshold pressure. Also, it provides such a gas exhaust system wherein such at least one pressure relief valve comprises at least one expulsion port structured and arranged to: expel gases from such at least one component to relieve gas pressure, and couple with such at least one component gas conduit; wherein the expelled gasses are isolated from such at least one enclosed environment. In addition, it provides such a gas exhaust system wherein such at least one pressure relief valve comprises at least one carbonator pressure relief valve. And, it provides such a gas exhaust system wherein such at least one pressure relief valve comprises at least one bulk syrup tank pressure relief valve.

Further, it provides such a gas exhaust system wherein: such at least one expelled gas receiver comprises at least one exhaust manifold; and such at least one directional restrictor is situate between each such at least one component of such multiple components and such at least one exhaust manifold. Even further, it provides such a gas exhaust system wherein such at least one pressure relief valve comprises: at least one bulk syrup tank pressure relief valve; and at least one carbonator pressure relief valve. Moreover, it provides such a gas exhaust system wherein such at least one expelled gas receiver comprises at least one exhaust manifold. Additionally, it provides such a gas exhaust system wherein such at least one directional restrictor comprises at least one check valve. Also, it provides such a gas exhaust system further comprising at least one secondary expelled gas receiver structured and arranged to: receive the expelled gasses from at least two subcomponents of such at least one component, which expel gases; and couple with such at least one expelled gas receiver to exhaust the expelled gasses. In addition, it provides such a gas exhaust system wherein such at least one secondary expelled gas receiver couples with such at least two subcomponents of at least one automatic beverage system.

In accordance with another preferred embodiment hereof, this invention provides a gas exhaust system, relating to expelled gasses from components of beverage dispensing apparatuses positioned in enclosed spaces, comprising: at least one manifold structured and arranged to receive the expelled gasses from multiple components of at least one beverage dispensing apparatus; wherein such multiple components are situate within at least one enclosed environment; and at least one component gas conduit structured and arranged to couple with at least one component of such multiple components of at least one beverage dispensing apparatus, and couple with such at least one manifold; wherein such at least one component gas conduit comprises at least one gas channel structured and arranged to channel the expelled gasses from such at least one component to such at least one manifold; and at least one exhaust gas conduit structured and arranged to couple with such at least one manifold, and exhaust the expelled gasses received by such at least one manifold to an external environment external to the at least one enclosed environment; and at least one check valve structured and arranged to restrict directional flow of the expelled gasses toward such external environment and away from such multiple components; wherein the expelled gasses from such multiple components of such at least one beverage dispensing apparatus are exhausted to such external environment instead of such at least one enclosed environment.

And, it provides such a gas exhaust system further comprising: such at least one beverage dispensing apparatus; wherein such multiple components comprise at least one syrup pump, at least one carbonator, at least one bulk syrup tank, at least one frozen beverage dispenser, at least one automated beverage system; wherein such at least one manifold is coupled to each at least one syrup pump, each at least one carbonator, each at least one bulk syrup tank, each at least one frozen beverage dispenser, each at least one automated beverage system; wherein such at least one check valve is situate between each such at least one component of such multiple components and such at least one exhaust manifold; wherein such at least one carbonator and such at least one bulk syrup tank each comprise at least one pressure relief valve; and wherein such at least one pressure relief valve comprises at least one expulsion port structured and arranged to expel gases from such at least one component to relieve gas pressure, and couple with such at least one component gas conduit.

In accordance with another preferred embodiment hereof, this invention provides a gas exhaust method, relating to expelled gasses from components of beverage dispensing apparatuses positioned in enclosed spaces, comprising the steps of: providing at least one expelled gas receiver structured and arranged to receive the expelled gasses from multiple components of at least one beverage dispensing apparatus positioned in at least one enclosed environment; retrofitting at least one gas release valve on at least one component of such multiple components of such at least one beverage dispensing apparatus with at least one gas release coupler; couple each such at least one component of such multiple components, which expel gasses, to such at least one expelled gas receiver with at least one component gas conduit; couple such at least one expelled gas receiver to at least one exhaust conduit structured and arranged to exhaust the expelled gasses from such at least one expelled gas receiver to an external environment external to the at least one enclosed environment; and restrict directional flow of the expelled gasses toward such external environment and away from such multiple components; wherein the expelled gasses from such multiple components of such at least one beverage dispensing apparatus are exhausted to such external environment instead of such at least one enclosed environment.

Further, it provides such a gas exhaust method wherein the step of retrofitting comprises the step of replacing such at least one gas relief valve on at least one carbonator with at least one gas release carbonator coupler structured and arranged to couple with such at least one component gas conduit. Even further, it provides such a gas exhaust method wherein the step of retrofitting further comprises the step of replacing such at least one gas relief valve on at least one bulk syrup tank with at least one gas release bulk syrup tank coupler structured and arranged to couple with such at least one component gas conduit. Even further, it provides such a gas exhaust method wherein the step of restricting directional flow comprises coupling at least one check valve between such at least one expelled gas receiver and each such at least one component of such multiple components.

In accordance with another preferred embodiment hereof, this invention provides a gas exhaust method, relating to expelled gasses from components of beverage dispensing apparatuses positioned in enclosed spaces, comprising: receiving the expelled gasses from multiple components of at least one beverage dispensing apparatus; wherein such multiple components are situate within at least one enclosed environment; and exhausting the expelled gasses received to an external environment external to the at least one enclosed environment; isolating a fluid pathway, between at least one component of such multiple components and such external environment, from such at least one enclosed environment; and restricting directional flow of the expelled gasses toward such external environment and away from such multiple components; wherein the expelled gasses from such multiple components of such at least one beverage dispensing apparatus are exhausted to such external environment instead of such at least one enclosed environment.

In accordance with another preferred embodiment hereof, this invention provides a gas exhaust system, relating to expelled gasses from components of beverage dispensing apparatuses positioned in enclosed spaces, comprising: expelled gas receiver means for receiving the expelled gasses from multiple components of at least one beverage dispensing apparatus; wherein such multiple components are situate within at least one enclosed environment; and component-receiver coupler means for coupling at least one component of such multiple components, which expels the expelled gasses, with such expelled gas receiver means; wherein such component-receiver coupler means comprises fluid pathway isolator means for isolating a fluid pathway, between such at least one component and such at least one expelled gas receiver, from such at least one enclosed environment; and external-environment gas exhaust transporter means for transporting the expelled gasses from such expelled gas receiver means to an external environment external to the at least one enclosed environment; and directional restrictor means for restricting directional flow of the expelled gasses toward such external environment and away from such multiple components; wherein the expelled gasses from such multiple components of such at least one beverage dispensing apparatus are exhausted to such external environment instead of such at least one enclosed environment.

Even further, it provides such a gas exhaust system further comprising secondary expelled gas receiver means for: receiving the expelled gasses from at least two subcomponents of such at least one component, which expel gases; and coupling with such expelled gas receiver means to exhaust the expelled gasses. Even further, it provides such a gas exhaust system wherein such secondary expelled gas receiver means couples with such at least two subcomponents of at least one automatic beverage system.

And, this application provides for each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
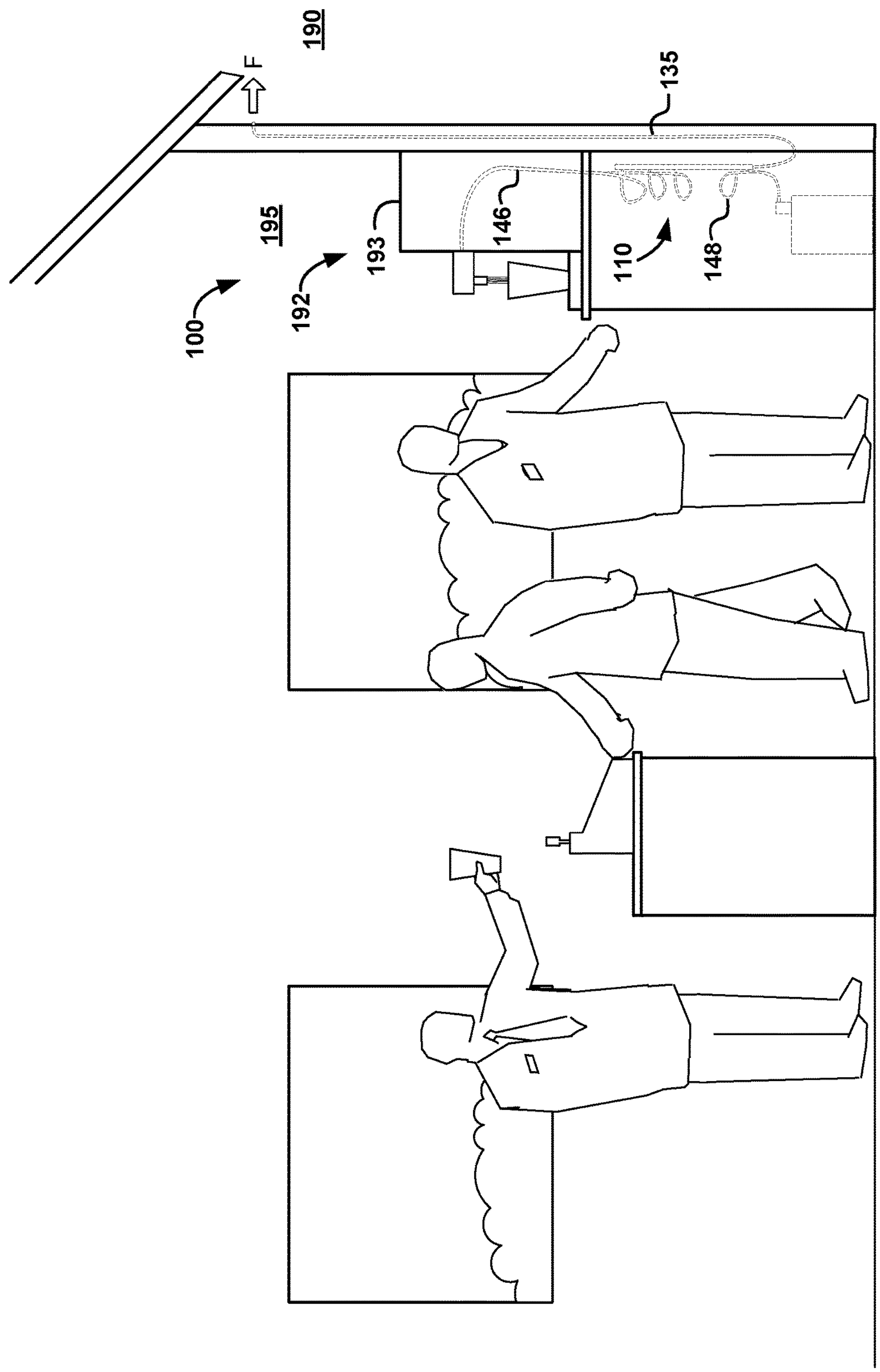
FIG. 1 shows a side view illustrating a gas exhaust system according to a preferred embodiment of the present invention.

FIG. 1 shows a side view illustrating a gas exhaust system 100 according to a preferred embodiment of the present invention. Beverage dispensing apparatuses 192 such as a fountain drink machine 193 operate using pressurized gas, particularly carbon dioxide gas. Some components of beverage dispensing apparatus 192 expel gas as a means to operate and other components expel gas due to an overpressure within the component. Applicant has noted that the expulsion of these gases occurs locally to the component. When the components rest within an enclosed environment 195, such as that of a back-room or in the serving area within a store or restaurant, enclosed environment 195 runs the risk of having elevated concentrations of the expelled gasses (at least herein embodying wherein such multiple components are situate within at least one enclosed environment). Applicant's invention prevents the gasses from entering into enclosed environment 195 by receiving the expelled gasses and then exhausting the expelled gases to an external environment 190, such as the outside of the store or restaurant, as shown. Thereby isolating the expelled gasses from enclosed environment 195 and preventing them from contributing to the concentrations of those gasses within enclosed environment 195, as shown. For simplicity, only some of the components of beverage dispensing apparatus 192 are depicted in FIG. 1, and only conduits/hoses/lines pertaining to the handling of the expelled gasses are depicted. Many components of both this invention and beverage dispensing apparatus 192 are typically in varying locations and are connected through a series of conduits/hoses/lines. For more detailed illustration of the particular components related to this invention see FIGS. 2-9.

Figure 2:
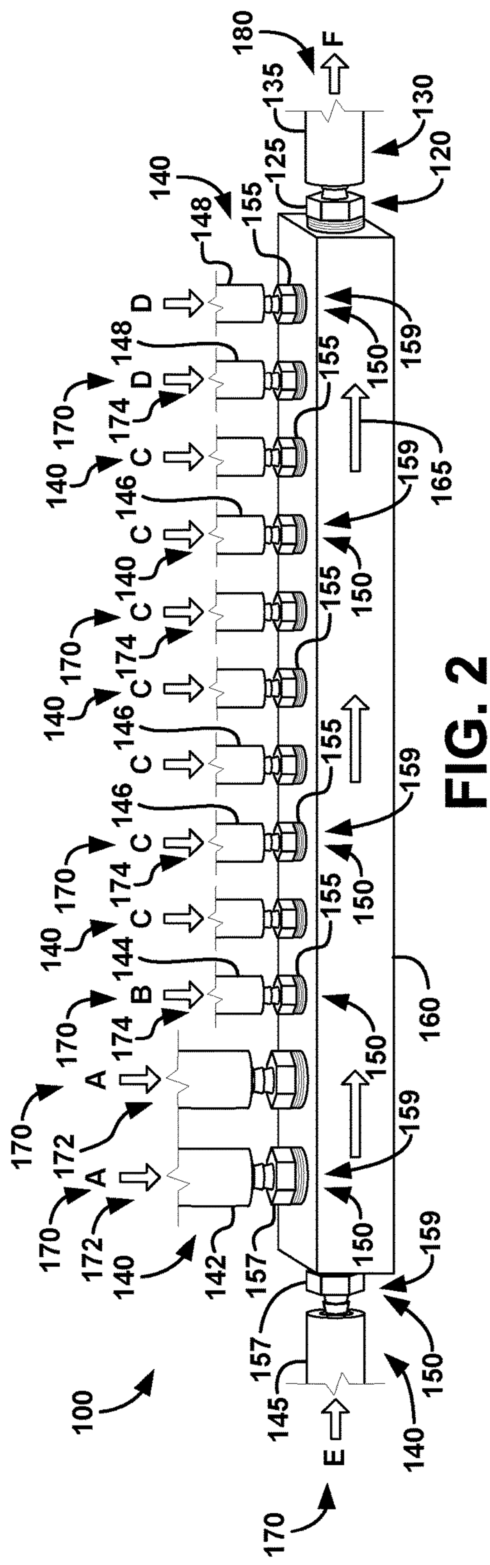
FIG. 2 shows a perspective view, illustrating an exhaust manifold of a gas exhaust system, according to the preferred embodiment of FIG. 1.

FIG. 2 shows a perspective view, illustrating an exhaust manifold 160 of a gas exhaust system 100, according to the preferred embodiment of FIG. 1. Gas exhaust system 100 preferably comprises at least one expelled gas receiver 110 (at least embodying herein at least one expelled gas receiver structured and arranged to receive the expelled gasses from multiple components of at least one beverage dispensing apparatus; and at least embodying herein expelled gas receiver means for receiving the expelled gasses from multiple components of at least one beverage dispensing apparatus), preferably at least one exhaust manifold 160 (at least embodying herein at least one manifold structured and arranged to receive the expelled gasses from multiple components of at least one beverage dispensing apparatus; and at least embodying herein wherein said at least one expelled gas receiver comprises at least one exhaust manifold), as shown. Expelled gas receiver 110 preferably comprises multiple receiving ports 170 designed to receive the expelled gasses from components of beverage dispensing apparatus 192, as shown. For illustrative purposes each receiving port 170 is denoted with an arrow and letter denoting the direction of gas flow and the source component, respectively. Expelled gas receiver 110 preferably further comprises at least one exhaust port 180 designed to exhaust the expelled gasses from components of beverage dispensing apparatus 192, as shown. Receiving ports 170 and exhaust port 180 preferably are linearly disposed along exhaust manifold 160, as shown. Upon reading the teachings of this specification, those with ordinary skill in the art will now appreciate that, under appropriate circumstances, considering such issues as cost, available space, etc., other dispositions of ports, such as, for example, circular, blocks, opposite, etc., may suffice.

Receiving ports 170 preferably comprise at least two sizes, preferably at least one large size 172 and at least one small size 174, as shown. Large size 172 preferably comprises about ½-inch, as shown. Small size preferably comprises about ¼-inch, as shown. Exhaust port 180 preferably comprises large size 172, as shown. Upon reading the teachings of this specification, those with ordinary skill in the art will now appreciate that, under appropriate circumstances, considering such issues as cost, machine designs, etc., other port arrangements, such as, for example, fewer ports, greater ports, differing sized ports, circular port arrangements, multiple rows of ports, etc., may suffice.

Each receiving port 170 preferably couples with at least one directional flow restrictor 150, preferably at least one check valve, as shown (at least embodying herein at least one check valve structured and arranged to restrict directional flow of the expelled gasses toward such external environment and away from such multiple components; and at least herein embodying wherein said at least one directional restrictor comprises at least one check valve). Applicant has found it necessary to restrict the fluid flow of the gasses to prevent back-pressure into other components, particularly when an overpressure release of gas is received by expelled gas receiver 110, as shown. It is noted that such a back-flow of gasses may damage the components. By incorporating directional flow restrictor 150 (at least embodying herein at least one directional restrictor structured and arranged to restrict directional flow of the expelled gasses toward such external environment and away from such multiple components) into expelled gas receiver 110, the direction of gas flow 165 is maintained to be away from the components of beverage dispensing apparatus 192 and toward exhaust port 180, as shown (at least embodying herein directional restrictor means for restricting directional flow of the expelled gasses toward such external environment and away from such multiple components).

Directional flow restrictor 150 preferably comprises at least one receiving line coupler 159 (at least herein embodying wherein said at least one directional restrictor is situate between each such at least one component of such multiple components and said at least one exhaust manifold; and at least herein embodying wherein the step of restricting directional flow comprises coupling at least one check valve between such at least one expelled gas receiver and each such at least one component of such multiple components), as shown, preferably at least one large receiving line coupler 157, alternately preferably at least one small receiving line coupler 155. Large receiving line coupler 157 preferably corresponds with large size port 172 and small receiving line coupler 155 preferably corresponds with small size port 174, as shown. Receiving line coupler 159 preferably comprises at least one threaded end 650 and at least one barbed end 655, as shown (see also FIG. 7). Threaded end 650 and barbed end 655 preferably comprise a common size, as shown. Therefore, large receiving line coupler 157 preferably comprises a ½-inch size on both threaded end 650 and barbed end 655, as shown; and small receiving line coupler 155 preferably comprises a ¼-inch size on both threaded end 650 and barbed end 655, as shown. Upon reading the teachings of this specification, those with ordinary skill in the art will now appreciate that, under appropriate circumstances, considering such issues as available materials, cost, etc., other couplers, such as, for example, quick-release couplers, John Guest® fittings, speed fittings, etc., may suffice.

Gas exhaust system 100 preferably further comprises at least one receiving line 140, as shown. Receiving line 140 preferably couples each component of beverage dispensing apparatus 192, which expels gas, with expelled gas receiver 110 using receiving line coupler 159, as shown (at least embodying herein at least one component-receiver coupler structured and arranged to couple at least one component of such multiple components, which expels the expelled gasses, with said at least one expelled gas receiver; and at least embodying herein component-receiver coupler means for coupling at least one component of such multiple components, which expels the expelled gasses, with said expelled gas receiver means). In a preferred embodiment, receiving line 140 preferably comprises at least one bulk syrup receiving line 142, at least one ABS (automatic beverage system) receiving line 144, at least one syrup pump receiving line 146, and at least one carbonator receiving line 148, as shown. Bulk syrup receiving line 142 preferably couples between expelled gas receiver 110 and at least one bulk syrup container 410, as shown (see also FIG. 5). ABS receiving line 144 preferably couples between expelled gas receiver 110 and at least one ABS subsystem, as shown (see also FIG. 3). Syrup pump receiving line 146 preferably couples between expelled gas receiver 110 and at least one syrup pump 310, as shown (see also FIG. 4). Carbonator receiving line 148 preferably couples between expelled gas receiver 110 and at least one carbonator 510, as shown (see also FIG. 6). Upon reading the teachings of this specification, those with ordinary skill in the art will now appreciate that, under appropriate circumstances, considering such issues as cost, available materials, etc., other receiver configurations, such as, for example, large fitting receivers separated from small fitting receivers, multiple serial receivers, multiple parallel receivers, etc., may suffice.

Additionally, receiving line 140 preferably comprises at least one extension receiving line 145, as shown. Extension receiving line 145 preferably couples to expelled gas receiver 110, preferably using large receiving line coupler 157, as shown. Extension receiving line preferably couples expelled gas receiver 110 with at least one additional expelled gas receiver 110, alternately preferably with a single component of another beverage dispensing apparatus 192, as shown, such as a frozen carbonated beverage machine, which typically comprises a carbonator. Upon reading the teachings of this specification, those with ordinary skill in the art will now appreciate that, under appropriate circumstances, considering such issues as cost, variation of configurations, etc., other expelled gas receiver configurations, such as, for example, fewer ports, more ports, capped off ports, etc., may suffice.

Exhaust port 180 preferably couples with at least one exhaust line 130, preferably at least one exterior exhaust line 135, as shown, alternately preferably to extension receiving line 145 (not shown) of another expelled gas receiver 110. Exterior exhaust line 135 preferably ends in external environment 190, as shown in FIG. 1. Exterior exhaust line 135 preferably couples to exhaust port 180 using at least one exhaust line coupler 120, preferably at least one adapter fitting 125, as shown. Adapter fitting 125 preferably permits unrestricted gas flow, preferably encouraging gas flow 165 toward external environment 190, as shown. Adapter fitting 125 preferably comprises threaded end 620 and barbed end 625 (see FIG. 7), preferably similar to threaded end 650 and barbed end 655 of receiving line coupler 159, as shown. Adapter fitting 125 preferably comprises a ½-inch size on both threaded end 620 and barbed end 625, as shown.

Since exhaust pressures are typically low due to the open flow of gas exhaust system 100 due to the open end of exhaust line 130, receiving line 140 (at least embodying herein at least one component gas conduit structured and arranged to couple with at least one component of such multiple components of at least one beverage dispensing apparatus, and couple with said at least one manifold; and at least herein embodying wherein said at least one component gas conduit comprises at least one gas channel structured and arranged to channel the expelled gasses from such at least one component to said at least one manifold; and at least herein embodying wherein said at least one component-receiver coupler further comprises at least one component gas conduit) and exhaust line 130 (at least embodying herein at least one exhaust gas conduit structured and arranged to couple with said at least one manifold, and exhaust the expelled gasses received by said at least one manifold to an external environment external to the at least one enclosed environment; and at least embodying herein at least one external-environment gas exhaust pathway structured and arranged to exhaust the expelled gasses from said at least one expelled gas receiver to an external environment external to the at least one enclosed environment; and at least embodying herein external-environment gas exhaust transporter means for transporting the expelled gasses from said expelled gas receiver means to an external environment external to the at least one enclosed environment) preferably comprise low pressure tubing, as shown. Upon reading the teachings of this specification, those with ordinary skill in the art will now appreciate that, under appropriate circumstances, considering such issues as cost, available materials, etc., other tubing materials, such as, for example, reinforced tubing, solid conduit, jacketed tubing, etc., may suffice.

Figure 3:
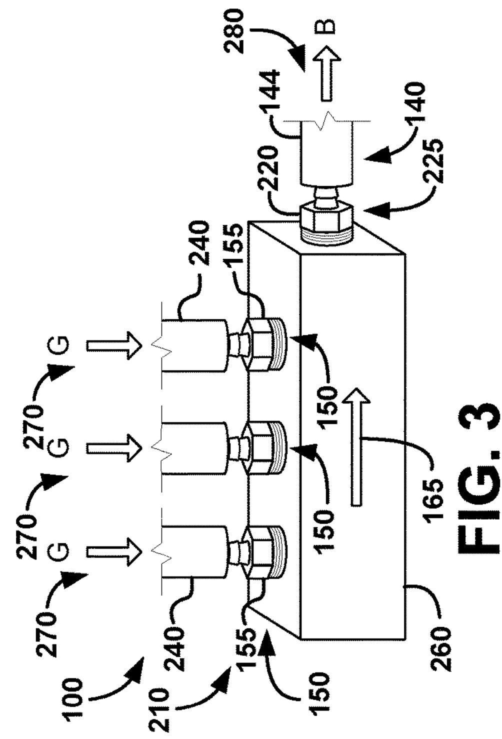
FIG. 3 shows a perspective view, illustrating a secondary exhaust manifold of the gas exhaust system, according to the preferred embodiment of FIG. 2.

FIG. 3 shows a perspective view, illustrating a secondary exhaust manifold 260 of gas exhaust system 100, according to the preferred embodiment of FIG. 2. Gas exhaust system 100 preferably comprises secondary exhaust manifold 260, as shown. ABS (automatic beverage system) components also utilize pressurized gasses and expel gasses to operate. As an ABS typically has multiple components expelling gases, secondary exhaust manifold 260 preferably couples with each of these components to receive the expelled gasses and exhaust the expelled gasses to expelled gas receiver 110, as shown.

Gas exhaust system 100 preferably comprises at least one secondary receiving line 240, preferably coupling secondary exhaust manifold 260 to each component expelling gases in ABS, as shown (at least herein embodying wherein said at least one secondary expelled gas receiver couples with such at least two subcomponents of at least one automatic beverage system; and at least herein embodying wherein said secondary expelled gas receiver means couples with such at least two subcomponents of at least one automatic beverage system). Secondary receiving line 240 is substantially similar to receiving line 140, preferably particularly ABS receiving line 144, syrup pump receiving line 146, and carbonator receiving line 148, as shown.

Secondary exhaust manifold 260 preferably comprises at least one receiving port 270, as shown. Receiving port 270 is substantially similar to receiving port 170, preferably particularly comprising small size 174, as shown. Secondary exhaust manifold 260 preferably couples with receiving line 270 using receiving line coupler 159, preferably small receiving line coupler 155, as shown. Secondary exhaust manifold preferably further comprises directional flow restrictor 150, as shown. Preferably, directional flow restrictor 150 maintains gas flow 165, as shown.

Secondary exhaust manifold 260 (at least embodying herein at least one secondary expelled gas receiver structured and arranged to receive the expelled gasses from at least two subcomponents of such at least one component, which expel gases, and couple with said at least one expelled gas receiver to exhaust the expelled gasses; and at least embodying herein secondary expelled gas receiver means for receiving the expelled gasses from at least two subcomponents of such at least one component, which expel gases, and coupling with said expelled gas receiver means to exhaust the expelled gasses) preferably further comprises at least one exhaust port 280, as shown. Exhaust port 280 is preferably substantially similar to exhaust port 180, as shown. However, exhaust port 280 preferably comprises about a ¼-inch size, as shown. Exhaust port 280 preferably couples with at least one exhaust line coupler 220, preferably at least one adapter fitting 225, as shown. Adapter fitting 225 is preferably substantially similar to adapter fitting 125, as shown. However, like exhaust port 280, adapter fitting 225 preferably comprises about a ¼-inch size, as shown. Secondary exhaust manifold 260 preferably couples with ABS receiving line 144 using exhaust line coupler 220, as shown. Upon reading the teachings of this specification, those with ordinary skill in the art will now appreciate that, under appropriate circumstances, considering such issues as cost, available space, etc., other secondary manifolds, such as, for example, carbonator only manifolds, pump only manifolds, bulk tank only manifolds, etc., may suffice.

Figure 4:
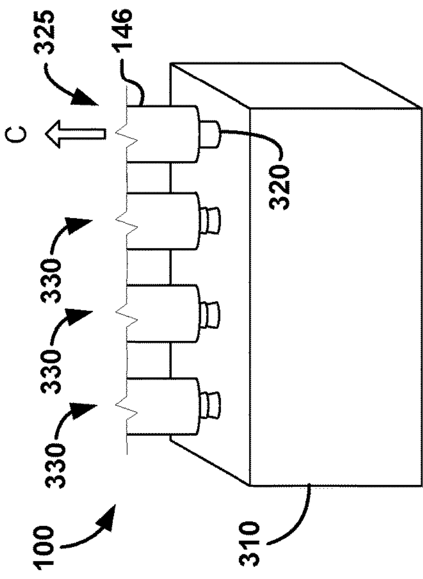
FIG. 4 shows a perspective view, illustrating a syrup pump connected to the gas exhaust system, according to the preferred embodiment of FIG. 3.

FIG. 4 shows a perspective view, illustrating a syrup pump 310 connected to gas exhaust system 100, according to the preferred embodiment of FIG. 3. Syrup pump 310 preferably comprises drink dispensing ports 330 and gas exhaust port 325, as shown. Drink dispensing ports 330, as shown, preferably connect to drink dispensing lines, typically comprising syrup and carbonation lines. Gas exhaust port 325 typically exhausts to enclosed environment 195, however, in gas exhaust system 100, gas exhaust port 325 preferably couples to syrup pump receiving line 146, as shown. Gas exhaust port 325 typically comprises at least one exhaust pipe 320, as shown. Exhaust pipe 320 typically comprises a smooth-sided tube projecting from the body of syrup pump 310, as shown. Exhaust pipe preferably will slip-fit to couple with syrup pump receiving line 146, as shown. When a slip-fit is too loose, preferably a crimping band is used to secure syrup pump receiving line 146, as shown. Upon reading the teachings of this specification, those with ordinary skill in the art will now appreciate that, under appropriate circumstances, considering such issues as cost, available materials, etc., other securing methods, such as, for example, shrink fit tubing, adapter fittings, varying tubing sizes, etc., may suffice.

Figure 5:
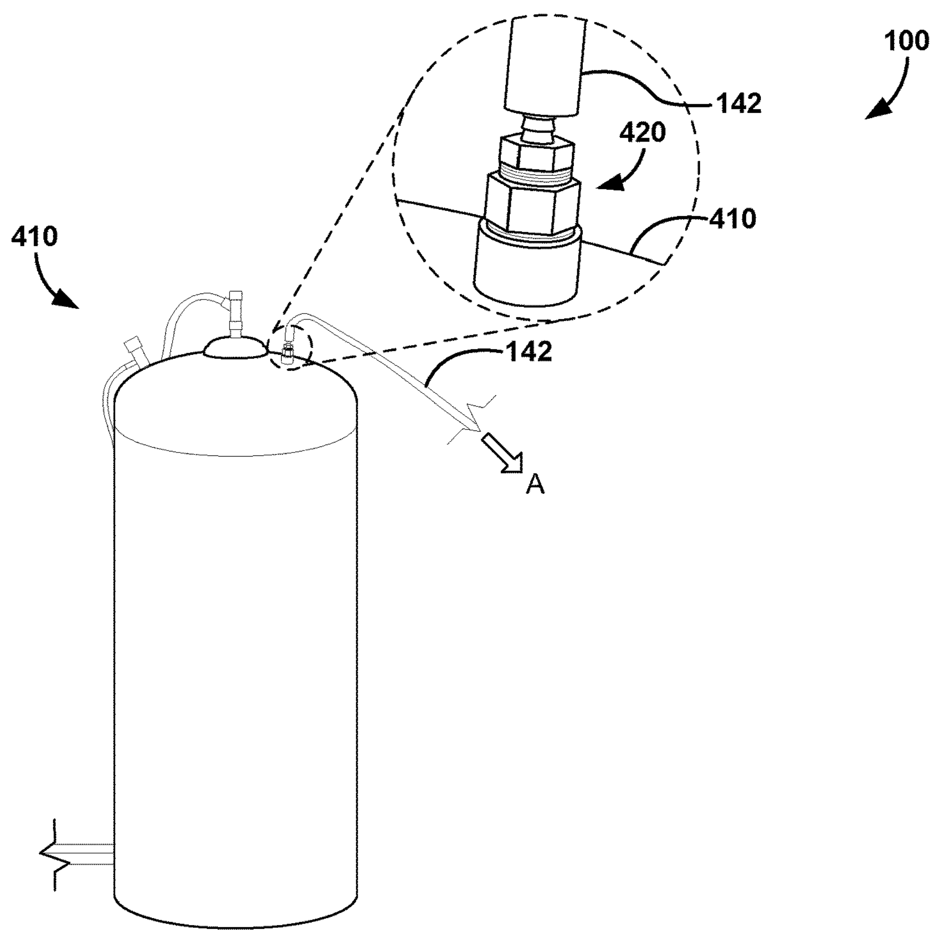
FIG. 5 shows a perspective view, illustrating a bulk syrup tank connected to the gas exhaust system, according to the preferred embodiment of FIG. 4.

FIG. 5 shows a perspective view, illustrating a bulk syrup tank 410 connected to gas exhaust system 100, according to the preferred embodiment of FIG. 4. Gas exhaust system 100 preferably further comprises at least one bulk syrup tank connector 420, as shown (at least herein embodying wherein said at least one component coupling fitting comprises at least one pressure relief valve structured and arranged to relieve gas pressure at at least one threshold pressure). Bulk syrup tank connector 420 preferably replaces the overpressure valve on bulk syrup tanks, as shown. The overpressure valve typically attached to bulk syrup tanks vent gasses when an overpressure occurs directly to enclosed environment 195 through at least one hole in the overpressure valve. Bulk syrup tank connector 420 of bulk syrup tank 410 preferably comprises a coupler capable of coupling with bulk syrup receiving line 142, preferably to vent gases through bulk syrup receiving line 142 and away from enclosed environment 195, as shown. (See also FIG. 9.)

Figure 6:
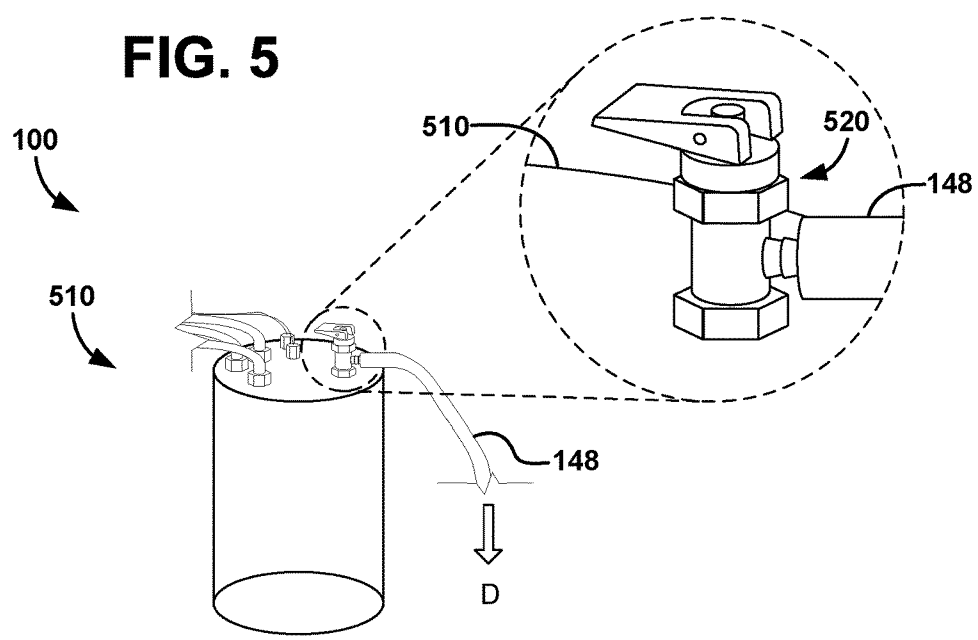
FIG. 6 shows a perspective view, illustrating a carbonator connected to the gas exhaust system, according to the preferred embodiment of FIG. 7.

FIG. 6 shows a perspective view, illustrating a carbonator connected to the gas exhaust system, according to the preferred embodiment of FIG. 5. Gas exhaust system 100 preferably further comprises at least one carbonator connector 520, as shown. Carbonator connector 520 preferably replaces the relief valve on carbonators, as shown. The relief valve typically attached to carbonators vents gasses when an overpressure occurs (or when manually actuated) directly to enclosed environment 195 through at least one hole in the relief valve, as shown. Carbonator connector 520 of carbonator 510 preferably comprises a coupler capable of coupling with carbonator line 148, preferably to vent gases through carbonator line 148 and away from enclosed environment 195, as shown. (See also FIG. 8.)

Figure 7:
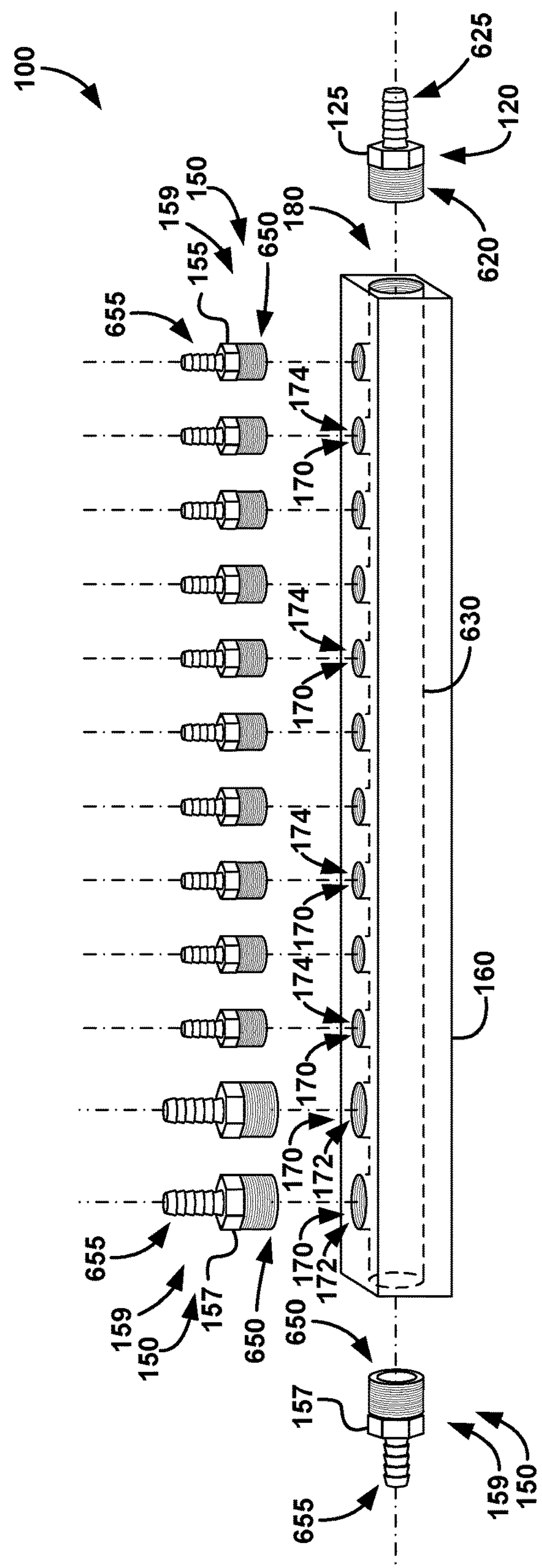
FIG. 7 shows an exploded view of the exhaust manifold according to the preferred embodiment of FIG. 2.

FIG. 7 shows an exploded view of exhaust manifold 160 according to the preferred embodiment of FIG. 2. Exhaust manifold 160 preferably comprises multiple ports (receiving port 170 and exhaust port 180), as shown. Each receiving port 170 preferably comprises threading, preferably to permit receiving line coupler 159 to thread into receiving port 170, as shown. Receiving line coupler 159 is coupled and sealed in receiving port 170, as shown. Likewise, each exhaust port 180 preferably comprises threading, preferably to permit exhaust line coupler 120 to thread into exhaust port 180, as shown. Exhaust line coupler 120 is coupled and sealed in exhaust port 180, as shown. For an air-tight seal, plumber's tape is preferably used (not shown). Each port (receiving port 170 and exhaust port 180) preferably connects to at least one central gas-flow channel 630, as shown. Gases received by expelled gas receiver 110 preferably flow through directional flow restrictor 150 and into central gas-flow channel 630, as shown. Once in central gas-flow channel 630, gas flow can preferably only go toward exhaust port 180 as directional flow restrictor 150 on each receiving line 170 prevents back-flow toward the components of beverage dispensing apparatus 192, as shown.

Figure 8:
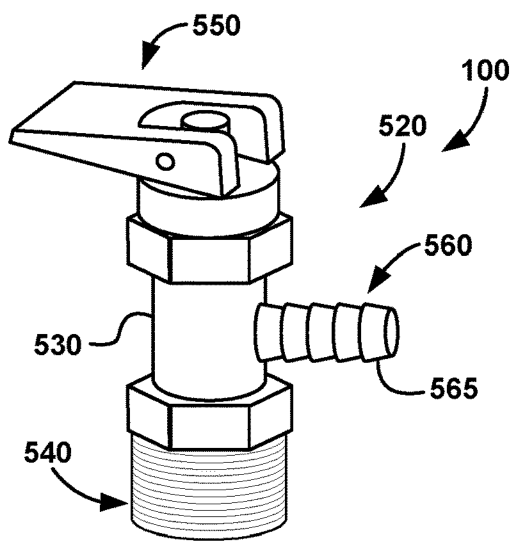
FIG. 8 shows a perspective view, illustrating a carbonator connector of the gas exhaust system, according to the preferred embodiment of FIG. 6.

FIG. 8 shows a perspective view, illustrating carbonator connector 520 of gas exhaust system 100, according to the preferred embodiment of FIG. 6. Carbonator connector 520 preferably comprises at least one relief valve 530, as shown. Relief valve 530 (at least herein embodying wherein said at least one pressure relief valve comprises at least one carbonator pressure relief valve) preferably relieves pressure from carbonator 510 when an over-pressure occurs within carbonator 510, as shown. Relief valve 530 preferably comprises at least one threaded fitting 540, preferably coupled with carbonator 510, as shown. In addition, relief valve 530 preferably comprises at least one manual actuator lever 550, as shown. Manual actuator lever 550 preferably opens relief valve 530 and vents gases from carbonator 510, as shown. Carbonator connector 520 preferably further comprises at least one line coupler 560, preferably at least one barbed line coupler 565, as shown. Barbed line coupler 565 preferably comprises a ¼-inch size. Line coupler 560 preferably couples with carbonator receiving line 148, as shown. Gasses vented through carbonator connector 520 preferably flow through line coupler 560 and carbonator receiving line 148 to expelled gas receiver 110, as shown.

Figure 9:
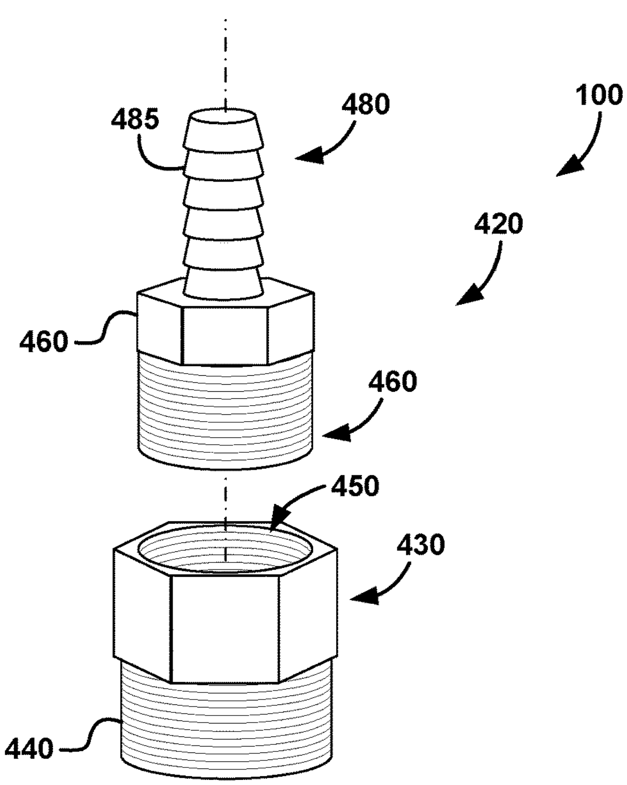
FIG. 9 shows an exploded view of bulk syrup tank connector of the gas exhaust system according to the preferred embodiment of FIG. 5.

FIG. 9 shows an exploded view of bulk syrup tank connector 420 of gas exhaust system 100 according to the preferred embodiment of FIG. 5. Bulk syrup tank connector 420 preferably comprises at least one overpressure valve 430, as shown. Overpressure valve 430 preferably couples to bulk syrup tank 410 using threaded fitting 440, as shown (at least herein embodying wherein said at least one component-receiver coupler further comprises at least one component coupling fitting). Overpressure valve 430 preferably relieves over-pressures from within bulk syrup tank 410, preferably venting gases. Overpressure valve 430 (at least herein embodying wherein said at least one pressure relief valve comprises at least one bulk syrup tank pressure relief valve) preferably further couples with at least one adapter fitting 470, as shown. Adapter fitting 470 preferably comprises at least one threaded end 460 and at least one barbed end 485, as shown. Adapter fitting preferably comprises a ½-inch size, as shown. Adapter fitting 470 preferably comprises at least one line coupler 480, preferably barbed end 485, as shown. Line coupler 480 preferably couples with bulk syrup receiving line 142, as shown (at least herein embodying wherein said at least one pressure relief valve comprises at least one expulsion port structured and arranged to couple with said at least one component gas conduit). Gasses vented through overpressure valve 430 preferably pass through adapter fitting 470 and bulk syrup receiving line 142 to expelled gas receiver 110, as shown (at least herein embodying wherein said at least one pressure relief valve comprises at least one expulsion port structured and arranged to expel gases from such at least one component to relieve gas pressure). In this manner the expelled gases are isolated from enclosed environment 195 instead of venting directly to enclosed environment 195 (at least embodying herein wherein said component-receiver coupler means comprises fluid pathway isolator means for isolating a fluid pathway, between such at least one component and said at least one expelled gas receiver, from such at least one enclosed environment; and at least herein embodying wherein the expelled gasses are isolated from such at least one enclosed environment).

In alternate embodiments of the present invention, control units and gas flow meters are available. Gas flow meters, preferably carbon dioxide sensing gas-flow meters, are placed in strategic points of the receiving lines and the exhaust lines. The control units utilize readings from the gas flow meters to monitor the amounts of carbon dioxide gas exhausting from various portions of the system. By so monitoring the gas flows, alerts are sent from the control units when abnormal amounts of carbon dioxide gas is exhausting from a portion of the system. These alerts can provide early detection of faulty relief valves and other components allowing replacement before wasting large amounts of bulk carbon dioxide, which provides cost savings over replacing bulk carbon dioxide more frequently.

Figure 10:
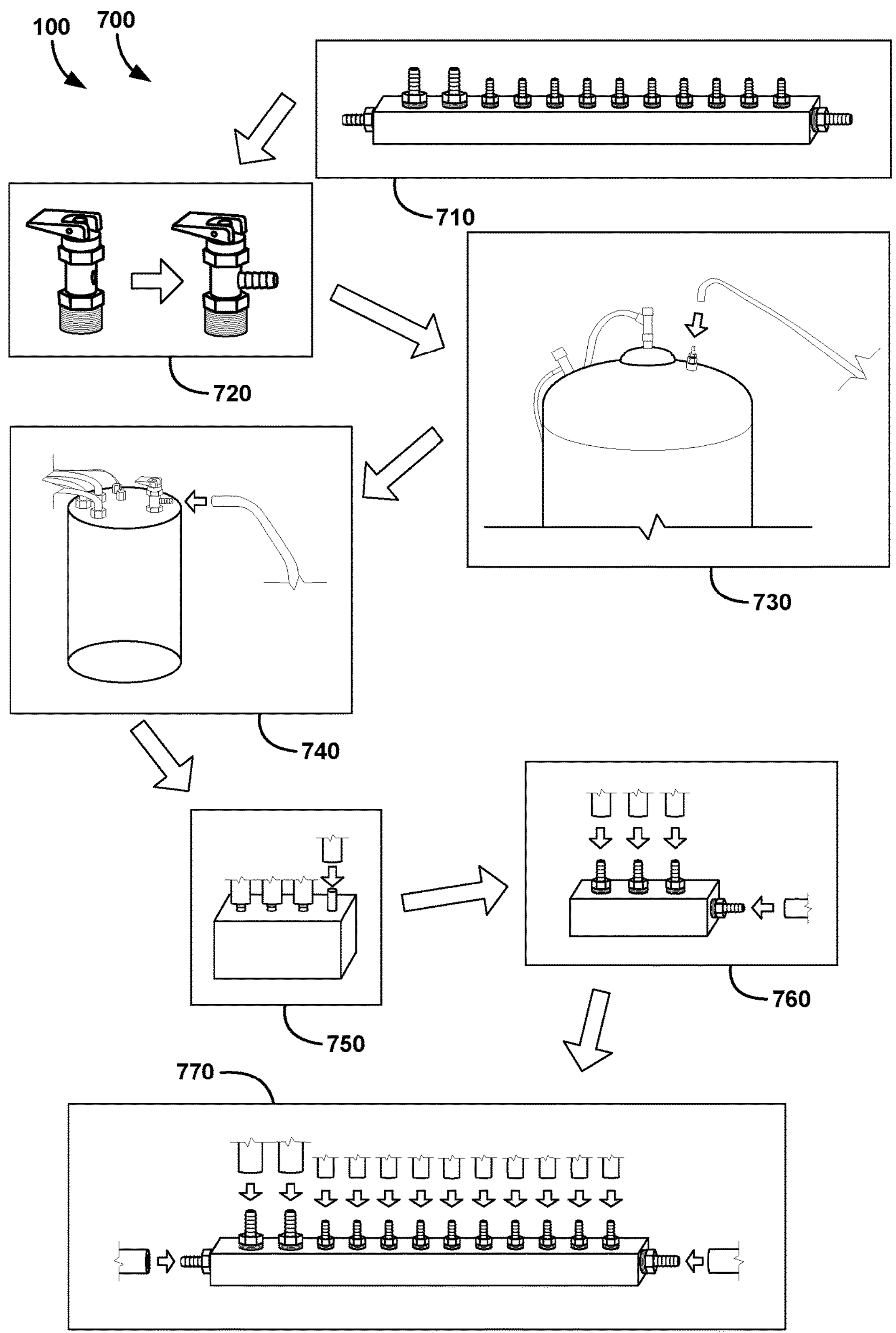
FIG. 10 shows a diagramatic view, illustrating a retrofit method of the gas exhaust system, according to the preferred embodiment of FIGS. 1-9.

FIG. 10 shows a diagramatic view, illustrating a retrofit method 700 of gas exhaust system 100, according to the preferred embodiment of FIGS. 1-9. Retrofit method 700 preferably comprises the steps of provide system components 710, replace gas expelling fittings 720, connect bulk syrup tanks 730, connect carbonators 740, connect syrup pumps 750, connect ABS 760, connect expelled gas receiver 770, as shown.

In step provide system components 710, expelled gas receiver 110 is preferably designed and manufactured to accommodate beverage dispensing apparatus 192, as shown. Further, expelled gas receiver 110 is provided or sold either preassembled or in a kit (at least embodying herein providing at least one expelled gas receiver structured and arranged to receive the expelled gasses from multiple components of at least one beverage dispensing apparatus positioned in at least one enclosed environment). For universality, expelled gas receiver 110 may include at least one plug for receiving port 170 to plug any receiving port 170 that is not needed in a particular installation, as shown. In addition to providing expelled gas receiver 110, in step provide system components 710, carbonator connector 520 and bulk syrup connector 420 are preferably provided, as shown. Carbonator connector 520 and bulk syrup connector 420 are preferably manufactured to include line coupler 560 and line coupler 480, respectively, as shown. Further, tubing for receiving lines 140 and exhaust line 130 are provided, as shown.

In step replace gas expelling fittings 720, carbonator connector 520 and bulk syrup connector 420 are coupled to each carbonator 510 and each bulk syrup tank 410 respectively, as shown. If an existing fitting, which expels gasses directly to enclosed environment 195, are already coupled to carbonator 510 and/or bulk syrup tank 410, they are removed prior to installation of carbonator connector 520 and/or bulk syrup connector 420, respectively, as shown (at least embodying herein retrofitting at least one gas release valve on at least one component of such multiple components of such at least one beverage dispensing apparatus with at least one gas release coupler; and at least herein embodying wherein the step of retrofitting comprises the step of replacing such at least one gas relief valve on at least one carbonator with at least one gas release carbonator coupler structured and arranged to couple with such at least one component gas conduit; and at least herein embodying wherein the step of retrofitting further comprises the step of replacing such at least one gas relief valve on at least one bulk syrup tank with at least one gas release bulk syrup tank coupler structured and arranged to couple with such at least one component gas conduit). The existing fittings lack the couplers needed to attach receiving lines 140, as shown. Where possible, old fittings preferably are retrofitted to include line couplers and thereby recycled.

Following couplings of carbonator connector 520 and bulk syrup connector 420, each receiving line 140 is preferably connected, as shown. In step connect bulk syrup tanks 730, bulk syrup tanks 730 are coupled to bulk tank receiving line 142, as shown. Bulk tank receiving line 142 is preferably run to the installation location of expelled gas receiver 110, as shown. In step connect carbonators 740, each carbonator 510 is coupled to a carbonator receiving line 148, as shown. Carbonator receiving line 148 is preferably run to the installation location of expelled gas receiver 110, as shown. In step connect syrup pumps 750, each syrup pump 310 is preferably coupled with a syrup pump receiving line 146, as shown. Each syrup pump receiving line 146 preferably is run to the installation location of expelled gas receiver 110, as shown.

In step connect ABS 760, ABS components are coupled to ABS receiving line 144, as shown. When ABS contains more than one component that expels gas, secondary exhaust manifold 260 preferably is provided (in step provide system components) and installed, as shown. With installation of secondary exhaust manifold 260, each ABS component is preferably coupled to secondary exhaust manifold with a secondary receiving line 240, as shown. Further, secondary exhaust manifold 260 preferably is coupled to ABS receiving line 144, as shown. ABS receiving line 144 is preferably run to the installation location of expelled gas receiver 110, as shown.

In step connect expelled gas receiver 770, each receiving line 140 is preferably connected to expelled gas receiver 110, as shown. When multiple expelled gas receivers are used in a single installation, each expelled gas receiver 110 couples in series using extension receiving line 145, as shown. Extension receiving line is preferably also utilized to connect an additional single component of another beverage dispensing apparatus 192, such as a frozen carbonated beverage machine, which typically comprises a carbonator, as shown. Further exhaust line 130 preferably couples with expelled gas receiver 110, as shown. Exhaust line 130 is preferably run to a chosen location outside enclosed environment 195 and capable of venting gasses from expelled gas receiver 110 to external environment 190, as shown. This arrangement at least embodies herein coupling each such at least one component of such multiple components, which expel gasses, to such at least one expelled gas receiver with at least one component gas conduit; and this arrangement at least embodying herein coupling such at least one expelled gas receiver to at least one exhaust conduit structured and arranged to exhaust the expelled gasses from said at least one expelled gas receiver to an external environment external to the at least one enclosed environment.

Upon reading the teachings of this specification, those with ordinary skill in the art will now appreciate that, under appropriate circumstances, considering such issues as beverage system configuration, cost, etc., other exhaust system configurations, such as, for example, multiple ABS, multiple single component dispensers, absence of bulk syrup tanks, absence of carbon-dioxide-expelling syrup pumps, etc., may suffice.

Upon completion of the installation, and during operation of beverage dispensing apparatus 192, gas exhaust system 100 preferably receives the expelled gasses from each component of beverage dispensing apparatus 192 and exhausts the expelled gases to external environment 190. Further gas exhaust system 100 preferably isolates the expelled gasses from enclosed environment 195 through creating an isolated fluid pathway from each component of beverage dispensing apparatus 192 and expelled gas receiver 110 and out to external environment 190. Gas flow 165 is restricted toward external environment 190 and away from components of beverage dispensing apparatus 192, preferably by directional flow restrictor 150. This arrangement at least herein embodies wherein the expelled gasses from such multiple components of such at least one beverage dispensing apparatus are exhausted to such external environment instead of such at least one enclosed environment.

Upon reading the teachings of this specification, those with ordinary skill in the art will now appreciate that, under appropriate circumstances, considering such issues as cost, available materials, future technologies, etc., other additional components, such as, for example, gas flow meters, quick-connect couplers, component leak detectors, carbon dioxide recyclers, carbon dioxide scrubbers, bypass systems, etc., may suffice.

Although applicant has described applicant's preferred embodiments of this invention, it will be understood that the broadest scope of this invention includes modifications such as diverse combinations, shapes, sizes, and materials. Such scope is limited only by the below claims as read in connection with the above specification. Further, many other advantages of applicant's invention will be apparent to those skilled in the art from the above descriptions and the below claims.

What is claimed is:

1. A gas exhaust system, relating to expelled gasses from components of beverage dispensing apparatuses positioned in enclosed spaces, comprising:

a) at least one expelled gas receiver structured and arranged to receive the expelled gasses from multiple components of at least one beverage dispensing apparatus;

b) wherein such multiple components are situate within at least one enclosed environment occupiable by at least one person; and c) at least one component-receiver coupler structured and arranged to couple at least one component of such multiple components, which expels the expelled gasses, with said at least one expelled gas receiver;

d) wherein said at least one component-receiver coupler comprises at least one fluid pathway isolator structured and arranged to isolate a fluid pathway, between such at least one component and said at least one expelled gas receiver, from such at least one enclosed environment; and e) at least one external-environment gas exhaust pathway structured and arranged to exhaust to atmosphere the expelled gasses from said at least one expelled gas receiver to an external unenclosed environment external and adjacent to the at least one enclosed environment; and f) at least one directional restrictor structured and arranged to restrict directional flow of the expelled gasses toward such external unenclosed environment and away from such multiple components;

g) wherein the expelled gasses from such multiple components of such at least one beverage dispensing apparatus are exhausted to such external unenclosed environment instead of such at least one enclosed environment.

2. The gas exhaust system according to claim 1 wherein said at least one component-receiver coupler further comprises:

a) at least one component coupling fitting; and
b) at least one component gas conduit.

3. The gas exhaust system according to claim 2 wherein said at least one component coupling fitting comprises at least one pressure relief valve structured and arranged to relieve gas pressure at at least one threshold pressure.

4. The gas exhaust system according to claim 3 wherein said at least one pressure relief valve comprises at least one expulsion port structured and arranged to:

a) expel gases from such at least one component to relieve gas pressure, and
b) couple with said at least one component gas conduit;
c) wherein the expelled gasses are isolated from such at least one enclosed environment.

5. The gas exhaust system according to claim 4 wherein said at least one pressure relief valve comprises at least one carbonator pressure relief valve.

6. The gas exhaust system according to claim 4 wherein said at least one pressure relief valve comprises at least one bulk syrup tank pressure relief valve.

7. The gas exhaust system according to claim 4 wherein:

a) said at least one expelled gas receiver comprises at least one exhaust manifold; and
b) said at least one directional restrictor is situate between each such at least one component of such multiple components and said at least one exhaust manifold.

8. The gas exhaust system according to claim 7 wherein said at least one pressure relief valve comprises:

a) at least one bulk syrup tank pressure relief valve; and
b) at least one carbonator pressure relief valve.

9. The gas exhaust system according to claim 1 wherein said at least one expelled gas receiver comprises at least one exhaust manifold.

10. The gas exhaust system according to claim 1 wherein said at least one directional restrictor comprises at least one check valve.

11. The gas exhaust system according to claim 1 further comprising at least one secondary expelled gas receiver structured and arranged to:

a) receive the expelled gasses from at least two subcomponents of such at least one component, which expel gases; and
b) couple with said at least one expelled gas receiver to exhaust the expelled gasses.

12. The gas exhaust system according to claim 11 wherein said at least one secondary expelled gas receiver couples with such at least two subcomponents of at least one automatic beverage system.

13. A gas exhaust system, relating to expelled gasses from components of beverage dispensing apparatuses positioned in enclosed spaces, comprising:

a) at least one manifold structured and arranged to receive the expelled gasses from multiple components of at least one beverage dispensing apparatus;
b) wherein such multiple components are situate within at least one enclosed environment occupiable by at least one person; and
c) at least one component gas conduit structured and arranged to
   i) couple with at least one component of such multiple components of at least one beverage dispensing apparatus, and
   ii) couple with said at least one manifold;
d) wherein said at least one component gas conduit comprises at least one gas channel structured and arranged to channel the expelled gasses from such at least one component to said at least one manifold; and
e) at least one exhaust gas conduit structured and arranged to
   i) couple with said at least one manifold, and
   ii) exhaust to atmosphere the expelled gasses received by said at least one manifold to an external unenclosed environment external and adjacent to the at least one enclosed environment; and
f) at least one check valve structured and arranged to restrict directional flow of the expelled gasses toward such external unenclosed environment and away from such multiple components;
g) wherein the expelled gasses from such multiple components of such at least one beverage dispensing apparatus are exhausted to such external unenclosed environment instead of such at least one enclosed environment.

14. The gas exhaust system according to claim 13 further comprising:

a) such at least one beverage dispensing apparatus;
b) wherein such multiple components comprise
   i) at least one syrup pump,
   ii) at least one carbonator,
   iii) at least one bulk syrup tank,
   iv) at least one frozen beverage dispenser,
   v) at least one automated beverage system;
c) wherein said at least one manifold is coupled to
   i) each at least one syrup pump,
   ii) each at least one carbonator,
   iii) each at least one bulk syrup tank,
   iv) each at least one frozen beverage dispenser,
   v) each at least one automated beverage system;
d) wherein said at least one check valve is situate between each such at least one component of such multiple components and said at least one exhaust manifold;
e) wherein said at least one carbonator and said at least one bulk syrup tank each comprise at least one pressure relief valve; and
f) wherein said at least one pressure relief valve comprises at least one expulsion port structured and arranged to
   i) expel gases from such at least one component to relieve gas pressure, and
   ii) couple with said at least one component gas conduit.

15. A gas exhaust method, relating to expelled gasses from components of beverage dispensing apparatuses positioned in enclosed spaces, comprising the steps of:

a) providing at least one expelled gas receiver structured and arranged to receive the expelled gasses from multiple components of at least one beverage dispensing apparatus positioned in at least one enclosed environment occupiable by at least one person;
b) retrofitting at least one gas release valve on at least one component of such multiple components of such at least one beverage dispensing apparatus with at least one gas release coupler;
c) couple each such at least one component of such multiple components, which expel gasses, to such at least one expelled gas receiver with at least one component gas conduit;

d) couple such at least one expelled gas receiver to at least one exhaust conduit structured and arranged to exhaust to atmosphere the expelled gasses from said at least one expelled gas receiver to an external unenclosed environment external and adjacent to the at least one enclosed environment; and e) restrict directional flow of the expelled gasses toward such external unenclosed environment and away from such multiple components;

f) wherein the expelled gasses from such multiple components of such at least one beverage dispensing apparatus are exhausted to such external unenclosed environment instead of such at least one enclosed environment.

16. The gas exhaust method according to claim 15 wherein the step of retrofitting comprises the step of replacing such at least one gas relief valve on at least one carbonator with at least one gas release carbonator coupler structured and arranged to couple with such at least one component gas conduit.

17. The gas exhaust method according to claim 16 wherein the step of retrofitting further comprises the step of replacing such at least one gas relief valve on at least one bulk syrup tank with at least one gas release bulk syrup tank coupler structured and arranged to couple with such at least one component gas conduit.

18. The gas exhaust method according to claim 17 wherein the step of restricting directional flow comprises coupling at least one check valve between such at least one expelled gas receiver and each such at least one component of such multiple components.

19. A gas exhaust method, relating to expelled gasses from components of beverage dispensing apparatuses positioned in enclosed spaces, comprising:

a) receiving the expelled gasses from multiple components of at least one beverage dispensing apparatus;

b) wherein such multiple components are situate within at least one enclosed environment occupiable by at least one person; and c) exhausting to atmosphere the expelled gasses received to an external unenclosed environment external and adjacent to the at least one enclosed environment;

d) isolating a fluid pathway, between at least one component of such multiple components and such external unenclosed environment, from such at least one enclosed environment; and e) restricting directional flow of the expelled gasses toward such external unenclosed environment and away from such multiple components;

f) wherein the expelled gasses from such multiple components of such at least one beverage dispensing apparatus are exhausted to such external unenclosed environment, during dispensing, instead of such at least one enclosed environment.

20. A gas exhaust system, relating to expelled gasses from components of beverage dispensing apparatuses positioned in enclosed spaces, comprising:

a) expelled gas receiver means for receiving the expelled gasses from multiple components of at least one beverage dispensing apparatus;

b) wherein such multiple components are situate within at least one enclosed environment occupiable by at least one person; and c) component-receiver coupler means for coupling at least one component of such multiple components, which expels the expelled gasses during dispensing, with said expelled gas receiver means;

d) wherein said component-receiver coupler means comprises fluid pathway isolator means for isolating a fluid pathway, between such at least one component and said at least one expelled gas receiver, from such at least one enclosed environment; and e) external-environment gas exhaust transporter means for transporting the expelled gasses from said expelled gas receiver means to an external unenclosed environment external and adjacent to the at least one enclosed environment; and f) directional restrictor means for restricting directional flow of the expelled gasses toward such external unenclosed environment and away from such multiple components;

g) wherein the expelled gasses from such multiple components of such at least one beverage dispensing apparatus are exhausted to such external unenclosed environment instead of such at least one enclosed environment.

21. The gas exhaust system according to claim 20 further comprising secondary expelled gas receiver means for:

a) receiving the expelled gasses from at least two subcomponents of such at least one component, which expel gases; and b) coupling with said expelled gas receiver means to exhaust the expelled gasses.

22. The gas exhaust system according to claim 21 wherein said secondary expelled gas receiver means couples with such at least two subcomponents of at least one automatic beverage system.

* * * * *